Jan. 13, 1931.  D. C. KLAUSMEYER  1,788,918
POWER TRAVERSE FOR RADIAL DRILL HEADS
Filed Jan. 31, 1924  2 Sheets-Sheet 1
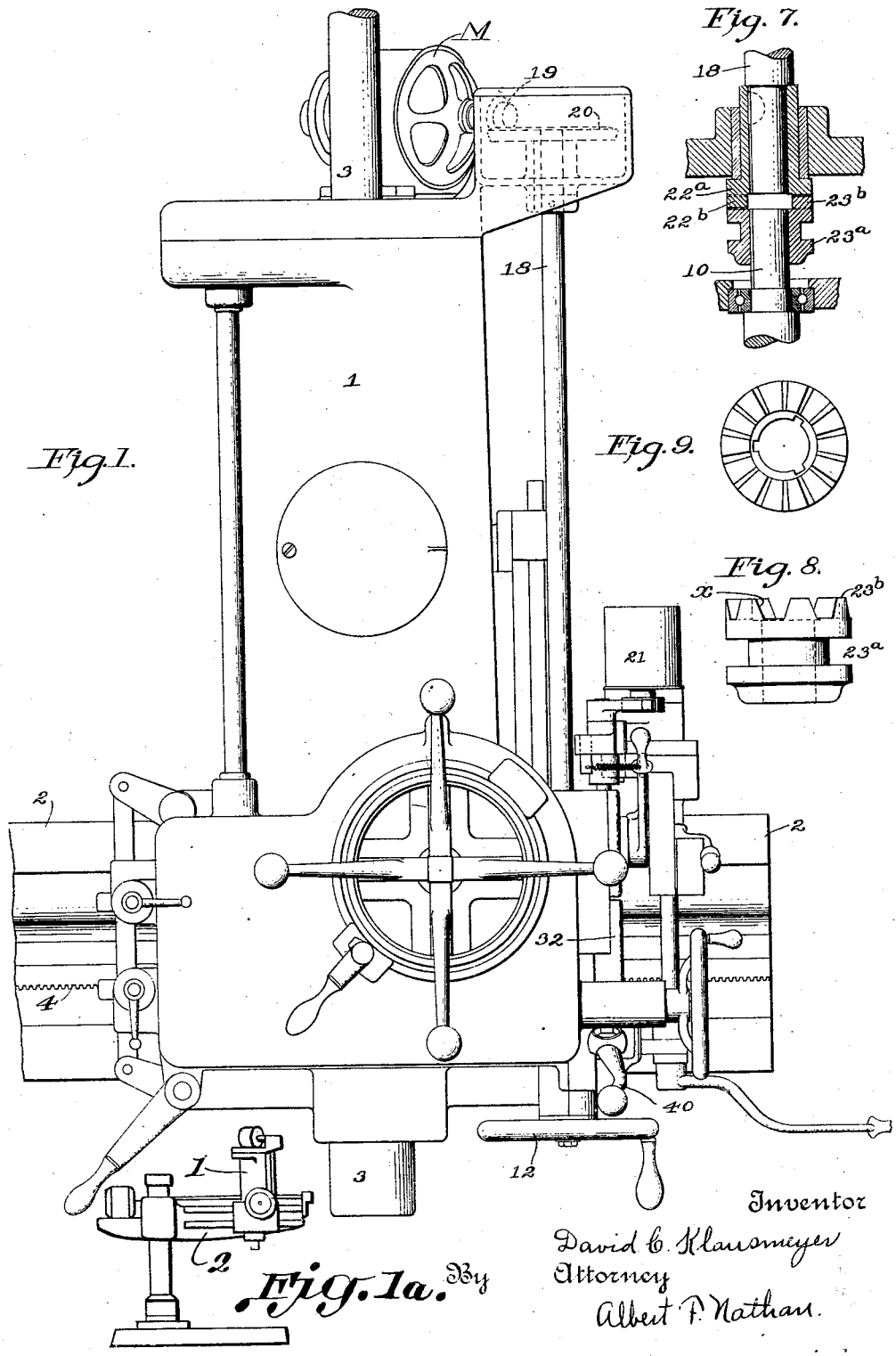

Jan. 13, 1931.  D. C. KLAUSMEYER  1,788,918
POWER TRAVERSE FOR RADIAL DRILL HEADS
Filed Jan. 31, 1924   2 Sheets-Sheet 2
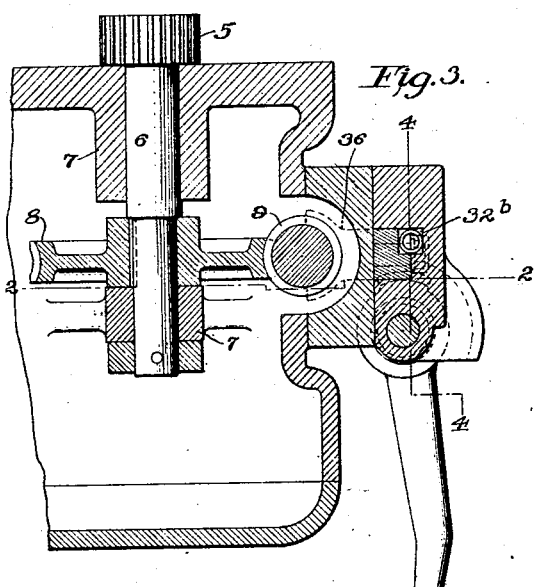
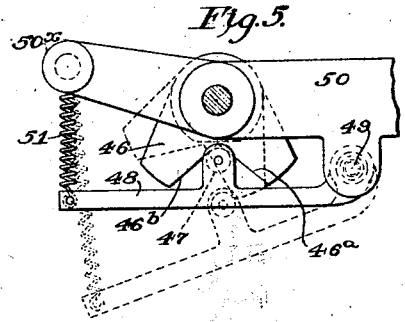
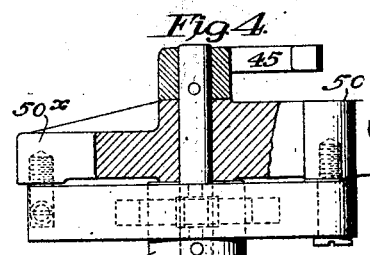
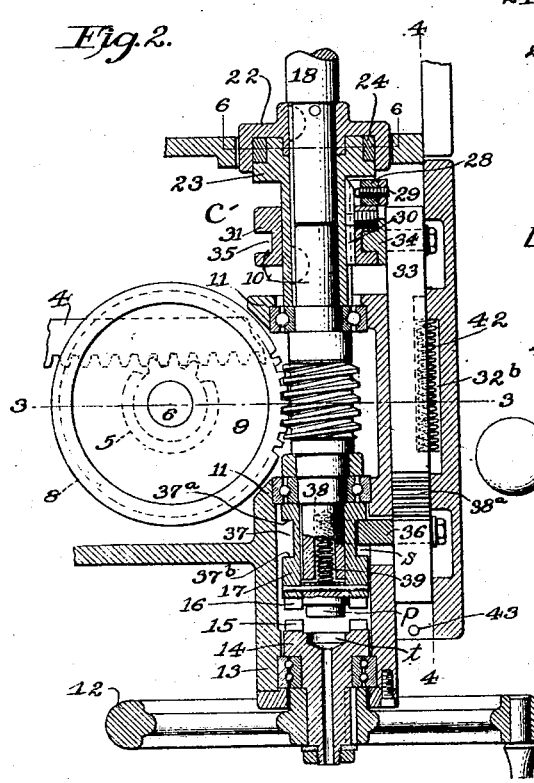
Inventor
David C. Klausmeyer
Attorney
Albert P. Nathan Patented Jan. 13, 1931

1,788,918

UNITED STATES PATENT OFFICE

DAVID C. KLAUSMEYER, OF CINCINNATI, OHIO, ASSIGNOR TO THE CINCINNATI BICKFORD TOOL COMPANY, OF CINCINNATI, OHIO, A CORPORATION OF OHIO

POWER TRAVERSE FOR RADIAL DRILL HEADS

Application filed January 31, 1924. Serial No. 689,649.

This invention relates to radial drilling machines and deals particularly with means for translating the drill head horizontally on the radial arm for the purpose of locating the drill with respect to the work, prior to a drilling operation.

Heretofore this adjustment has been effected manually by means of a hand-wheel carried by the drill-head which, through suitable connections, was adapted to rotate a pinion meshing with a rack fixed lengthwise of the radial arm; thus rotation of the hand-wheel shifted the drill-head lengthwise of the arm.

As these machines as a whole are of great size and the heads thereof are ponderous, weighing hundreds of pounds, the manual shifting of the head has been more or less of a task. To enable the operator, with his limited strength, more easily to effect this traverse, it has been customary to embody in the drill-head, between the hand-wheel and the shifting pinion, a speed-reduction gearing such, for example, as a worm and worm-wheel. This reduction in speed however necessitated a proportionate increase in the number of revolutions of the hand-wheel to shift the drill-head a predetermined distance.

In the operation of these machine-tools it is frequently necessary to move the drill-head a substantial distance (say from four to six feet) on the arm which, due to the speed reduction gearing, has required considerable time.

This invention has for an object to provide, in a radial drill-head, power means for translating the drill-head lengthwise of the radial arm whereby the required adjustments may be effected more expeditiously and with less effort than has heretofore been possible.

A further object is so to combine in a drill-head both power and manual means for shifting the drill-head, that either is available; the power means preferably being utilized for the greater adjustments and the manual means for securing the accurate setting of the drill on the work.

Another object of this invention is to provide a single controlling means for both the power and manual traverse mechanism and so to arrange them that either of the two selectively may be actuated, but not both simultaneously.

A still further object is to provide an automatic throw-out for the power drive, an automatic throw-in for the manual drive and means for bringing the power drive to rest, all of which become effective instantaneously upon release of the controlling lever after a power traverse has been effected.

Still another object of the invention is to combine in a drill-head a power-drive and a manual drive, both of which are capable of translating the drill-head in opposite directions on the arm, and providing a single controlling lever for selecting the drive and determining the direction of movement of the drill-head.

These and other objects have been attained in an ingenious manner by combining with the usual manual traverse mechanism a reversible power traverse mechanism and providing means for selectively connecting either of the two with the pinion that meshes with the stationary rack for shifting the drill-head horizontally; the other mechanism at that time being disconnected.

The power drive may conveniently consist of a reversible motor carried by the drill head and which may be operatively connected with the driving pinion. Throughout the specification and drawings the power drive is shown and described as including a reversible motor merely as one embodiment of the invention and it is to be understood that the invention also contemplates the use of various other forms of power drives and such forms are therefore intended to be covered by the claims.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Fig. 1 is a front elevation of a drill-head embodying the present invention. Fig. 1ª is a side elevation, on a greatly reduced scale, of a radial drill of the type in which the present invention has been embodied. Fig. 2 is a vertical section on the line 2—2 of Fig. 3 showing the means for operatively connecting both the power drive and the manual drive with the pinion that meshes with the usual stationary rack for translating the drill head. Fig. 3 is a horizontal section on the line 3—3 of Fig. 2. Fig. 4 is a vertical section on the lines 4—4 Figs. 2 and 3. Fig. 5 is a plan of the means for automatically discontinuing the power drive when the controlling lever is released. Fig. 6 is a section on the line 6—6 of Fig. 2. Fig. 7 is a modification of the upper portion of Fig. 2 showing an alternate form of impositive clutch for connecting the power drive with the drill-head translating gearing. Fig. 8 is a side elevation of one of the clutch members shown in Fig. 7. Fig. 9 is an end view of Fig. 8. Fig. 10 is a plan of the motor controller and its actuating arm.

Referring more particularly to the drawings the invention is disclosed in its preferred form as embodied in a drill-head 1 slidably mounted, in the usual manner, on the horizontal arm 2 of a radial drill of commercial form. This drill-head is provided with the usual drill-spindle 3 together with means for rotating it and feeding it lengthwise to cause the drill-point carried thereby to be moved toward and from the work, but as this mechanism forms no part of the present invention detailed illustration and description thereof is deemed unnecessary.

This invention relates particularly to the traverse of the drill-head on the horizontal arm and the means for effecting such traverse in opposite directions. To this end, there is secured lengthwise of the arm, a rack-bar 4 with which meshes a pinion 5 secured upon a shaft 6 journaled in bearings 7 in the drill-head. Thus rotation of the pinion will through its connection with the rack, effect translation of the drill-head on the arm; the direction of movement dependent upon the direction of rotation of the pinion.

Any suitable means may be employed for rotating the shaft 6, such as for example a worm-wheel 8 fixed to said shaft and a worm 9 meshing therewith and secured upon a shaft 10 non-translatably journaled in bearings 11 also carried by the drill-head. Two independent driving means are provided for rotating the shaft 10 in either of two directions to cause the worm-wheel to rotate the shaft 6 and thereby shift the drill-head in either direction on the arm 2. One of these driving means is adapted to be actuated manually, and comprises a hand-wheel 12 journaled in a bearing 13 in the drill-head. The hand-wheel carries a clutch member 14 providing clutch teeth 15 adapted to engage the teeth 16 of a clutch-member 17 splined upon the lower end of the shaft 10, thus when the clutch-member 17 is moved downwardly, by means later to be described, the clutch teeth 15 and 16 are connected and a driving connection is established between the hand-wheel and the shaft 10. The clutch teeth 15 and 17 are preferably formed with inclined edges to facilitate their engagement.

A power drive is also provided for rotating the shaft 10 and preferably comprises a power driven shaft 18 arranged co-axial with the shaft 10 and adapted to be impositively clutched thereto. Any suitable driving mechanism may be provided for rotating the shaft 18 in reverse directions. One convenient means consists of a reversible motor M secured upon the upper end of the drill-head. The motor shaft preferably carries a bevel-pinion 19 which meshes with and drives a bevel-gear 20 secured to the shaft 18. A motor controller 21, later to be referred to, affords means for determining the direction of rotation of the motor and thereby the direction of traverse of the drill-head.

The shafts 10 and 18 are adapted to be connected together by an impositive clutch device C preferably, but not necessarily, of the friction type. A clutch of this nature is shown in Figs. 2 and 6 and comprises a driving clutch member 22 fixed upon the shaft 18 and a driven clutch member 23 keyed to the shaft 10 and having a portion projecting into the member 22. A friction band 24 is located intermediate the members 22 and 23 and when expanded acts to lock the two together. The band 24 is preferably split and has its one end 24ª seated against an abutment 25 carried by the member 23 and its other end 24ᵇ in contact with a wall 26 provided by a short rock-shaft 27 journaled in the member 23. The shaft 27 carries a rock arm 28 adapted to be actuated through the adjustable contact screw 29, by a wedge-bar 30 carried by a shiftable collar 31 splined to the member 23, thus when the wedge-bar is shifted upwardly the shaft 27 is turned and the wall 26, acting upon the end 24ᵇ of the friction band, causes the band to expand and frictionally engage the members 22 and 23. This friction is sufficient to actuate the driving mechanism to cause translation of the head under normal conditions but permits the parts to slip under undue load and thereby acts as a safety device.

For certain purposes it may be desirable to construct the friction clutch in the simpler form as shown in Figs. 7, 8 and 9. This form comprises a clutch member 22ª fixed to the shaft 18 and provided with clutch teeth 22ᵇ adapted to engage similar teeth 23ᵇ provided by a shiftable clutch member 23ª splined to the shaft 10. The clutch teeth 22$^b$ and 23$^b$ are formed with inclined edges $x$ which under great strain act as cam surfaces and cause separation of the members 22$^a$ and 23$^a$.

As before stated the manual drive and the power drive are so related and controlled that the shifting of one into action automatically and simultaneously shifts the other out of action. To accomplish this result there is slidably mounted in a guideway 32$^a$ formed in a sub-casing 32 secured to the side of the drill-head, a bar 33 carrying at its upper end a shoe 34 which tracks the annular groove 35 in the collar 31. Adjacent its lower end the bar 33 carries a fork 36 which embraces the clutch member 17 within an annular groove 37. It is to be noted that the groove 37 is wider than the fork 36 an amount substantially the same as the depth of the teeth 16.

The lower end of the shaft 10 is formed with a cavity 38 within which is seated a coil spring 39 maintained under tension by having its lower end bearing against a plug $p$ fixed within the lower end of the member 17. This spring tends at all times to shift the clutch member downwardly on the shaft 10 to engage the teeth 15 and 16 but when the power drive is connected as shown in Fig. 2 this movement is prevented by means of the upper surface of the fork 36 engaging the upper wall 37$^a$ of the groove 37. The plug $p$ is preferably formed with a projecting end adapted to enter a socket $t$ in the member 14 to give a firmer union between the hand-wheel and the shaft 10.

The slide-bar 33 is formed adjacent the fork 36 with rack-teeth 38$^a$ which are engaged by teeth 39$^a$ formed on the semi-spherical end of a power traverse lever 40 pivotally mounted upon a rotatable, but non-translatable, motor controller shaft 41. This lever performs the double function of shifting the clutch members 17 and 23 and actuating a motor controller to determine the direction in which the drill-head shall be translated by the power drive.

A coil spring 42, located partly within a cavity 33$^a$ formed in the bar 33 and partly in a cavity 32$^b$ formed in the sub-casing 32, is compressed when the bar 33 is moved upwardly to engage the power drive and immediately upon release of the hand-lever 40 shifts the slide-bar 33 downwardly, thus disconnecting the power drive and engaging the clutch teeth 15 and 16.

Should the clutch-teeth 15 and 16 not be in position to register properly when the hand-lever 40 is released the member 17 will be lowered under the action of the spring 39, in unison with the slide-bar, until the faces of the teeth 15 and 16 contact.

The movement of the member 17 then ceases but the bar 33 has a further movement, taking up the space $s$ between the bottom of the fork 36 and the lower wall 37$^b$ of the groove 37, thus completely releasing the friction clutch C (or disengaging the clutch teeth 22$^b$ and 23$^b$) and discontinuing the power drive. The spring 39 remains ready to couple the clutch members 14 and 17 when they have been relatively rotated sufficiently to register their teeth.

It is to be understood that the mechanism described in the preceding paragraph is merely a safety device and is provided to meet conditions which occur infrequently, the normal action being to couple the manual drive simultaneously with the disengagement of the power drive.

A pin 43 is secured in the sub-casing 32 and acts as a stop to limit the downward movement of the bar 33.

To provide means for controlling the direction of rotation of the reversible motor M there is secured upon the drill-head a suitable motor-controller 21 of commercial form. This controller is adapted to be actuated by a segmental rock-arm 45 secured upon the shaft 41 to which the hand-lever 40 is pivoted. This motor controller and its actuating means are so constructed and arranged that when the clutch members 22 and 23 are connected and the hand-lever 40 is swung to the right as viewed in Fig. 4 the portion R of the arm 45 rotates the motor-controller clockwise and causes the motor to translate the drill-head toward the right. Likewise when the lever 40 is shifted to the left the portion L of the controller arm rotates the motor-controller anti-clockwise and causes the motor to reverse and translate the drill-head toward the left.

The motor controller, the clutch device C and the controlling hand-lever 40 are so constructed and arranged that the hand-lever may be shifted at will, that is, either the motor may be started before engaging the friction clutch or vice versa, thereby avoiding any confusion to the operator as to any set order of manipulation.

As before stated this invention proposes the automatic throw-out of the power drive, the simultaneous connection of the manual drive and the stopping of the motor immediately upon release of the controlling lever by the operator. This is effected by securing to the motor-controller shaft an arm 46 formed with two cam surfaces 46$^a$ and 46$^b$. These two cam surfaces may constitute a V-shaped notch within which is forced a roller 47 carried by an arm 48 pivoted at 49 to a bracket 50, forming a part of the drill-head.

The free end of the arm 48 has connected to it one end of a coil-spring 51 of which the other end is connected with an extension 50$^x$ of the bracket 50. As shown in dotted lines in Fig. 5, when the hand-lever 40 and the motor-controller shaft are rotated clock-wise the cam 46$^a$ forces the roller 47 and the arm 48 outwardly against the action of the spring 51, in which position they are held as long as the operator maintains the lever 40 in its adjusted position. Immediately upon release of the lever, the spring 51 draws the arm 48 and its attached roller inwardly and the roller acts upon the cam-surface 46ª to rotate the shaft 41 and the rock-arm 45 anticlockwise to the neutral positions shown in full lines in Figs. 5 and 10. The cam-surface 46ᵇ effects a similar action when the lever 45 is shifted in the opposite direction. The manner in which the clutch C is disengaged and the manual drive is coupled simultaneously with the rotation of the shaft 41 to stop the motor has already been explained.

From the foregoing, it will be observed that I have provided an extremely simple and efficient means for translating the drill-head on the radial arm either manually or by power and for automatically disconnecting the power drive and stopping the motor when the controlling lever is released.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention, and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. In a radial drill, the combination comprising an upright column; a radial arm; a drill head movable along the arm; mechanism for connecting the head to the arm for moving the head along the arm; power operated means carried wholly by the head for operating said mechanism to effect movement of the head along the arm; a motor carried by said drill head and operatively connected to actuate said power operated means; hand operated means carried wholly by the head for operating said mechanism to effect movement of the head along the arm; and means for insuring against the simultaneously operatively connecting of the power operated means and the hand operated means to said mechanism.

2. A radial drill combining an upright column; a radial arm; a bar carried by said arm; a drive shaft journaled lengthwise of said arm; a drill-head translatably mounted on said arm; a spindle journaled in said drill-head and rotated from said drive shaft; a motor carried by said drill head, and means carried wholly by said drill head and actuated by said motor and cooperating with said bar for rapidly traversing said drill-head on said arm.

3. In a radial drill, the combination comprising an upright column; a radial arm; a rack-bar carried by said arm; a drill head movable along said arm; a pinion carried by said head and meshing with said rack-bar; reversible power-actuated means carried wholly by said drill-head for operating said pinion to move the head along the arm; a reversible electric motor supported on said drill head and operatively connected to actuate said power actuated means; hand operated means for operating said pinion to move the head along the arm; and means for insuring against the simultaneously connecting of the power operated means and the hand operated means to said pinion.

4. A radial drill combining an upright column; a radial arm; a rack carried by said arm; a drill-head translatably mounted on the arm; a tool spindle rotatably and translatably journaled in said drill-head; a prime mover located adjacent said column; means including an arm shaft to rotate and translate said spindle; and reversible power actuated means, including a reversible motor; carried wholly by said drill head and cooperating with said rack for rapidly traversing said drill-head on said arm in opposite directions.

5. A radial drill combining an upright column; a radial arm; a drill-head mounted to have movement along the arm; a bar mounted on the arm; a rotatable element journaled in the drill head and operatively engaging said bar; power operated means including a motor, and hand operated means both carried by said drill head for rotating said element to effect movement of the head along the arm; a spring normally tending to render said power operated means ineffective; and a lever adapted to render said power means operative in opposition to said spring.

6. A radial drill combining an upright column; a radial arm; an arm shaft; a drill-head slidably mounted on the arm; a spindle rotatable in said drill head and driven from said power shaft; a rack-bar fixed to said arm; a pinion rotatably journaled in said drill-head and meshing with said rack-bar; and power-actuated means, including an electric motor and mechanism actuated thereby, carried wholly by said drill-head for rotating said pinion to effect translation of said drill-head on said arm.

7. A radial drill combining an upright column; a radial arm; a drill-head slidably mounted on the arm; a spindle rotatably journaled in said drill head; a prime mover adjacent said column adapted to rotate said spindle; a stationary rack on said arm; a pinion rotatably journaled in said drill-head and meshing with said rack; and reversible power-actuated means, including a reversible electric motor, supported wholly by said arm and operatively connected with said pinion to rotate it in opposite directions to cause it rapidly to traverse said drill-head in reverse directions on said arm.

8. A radial drill combining an upright column; a radial arm; a horizontally disposed power shaft extending along said arm; a drill-head translatably mounted on said arm; a spindle rotatably journaled in said drill head and driven from said power shaft; a rack-bar secured to said arm; a pinion journaled in said drill-head and meshing with said rack-bar; a motor carried by said drill-head; and operative connections between said motor and said pinion to enable said motor to rotate said pinion to cause it rapidly to traverse said drill-head on said arm.

9. A radial drill combining an upright column; a radial arm; a power element carried directly by the arm; a drill-head slidably mounted on the arm; a spindle rotatably journaled in said drill head and adapted to be driven from said power element; a rack carried by said arm; a pinion journaled in said drill-head and meshing with said rack; a reversible motor carried by said drill-head; a motor controller for determining the direction of rotation of said motor; an operative connection between said motor and said pinion to enable said motor rapidly to rotate said pinion and thereby traverse said drill-head on the arm; and means for actuating said motor controller to reverse the rotation of the motor to cause the pinion to traverse the drill-head in reverse directions.

10. A radial drill combining an upright column; a radial arm; a drill-head translatably mounted on the arm; a rack secured to said arm; a pinion rotatably journaled in said drill-head and meshing with said rack and adapted to translate said drill-head on said arm; speed-reduction gearing carried by said drill-head and operatively connected with said pinion; a manual drive for said gearing including a hand-wheel and a disconnectible clutch between the hand-wheel and said gearing; a power drive for said gearing including a power-driven shaft and a disconnectible clutch between said power shaft and said gearing; a clutch-actuating slide-bar operatively connected with said two clutches; means for manually shifting said slide-bar to disengage the manual feed and immediately thereafter to engage the power feed; and means for automatically disconnecting said power traverse mechanism when said manual shifting means is released.

11. A radial drill combining an upright column; a radial arm; a drill-head shiftably mounted on the arm; means for translating said drill-head on said arm, said means including a stationary rack; a pinion rotatably journaled in said drill-head and meshing with said rack; power actuated means for rotating said pinion, said power means including a power shaft; a second shaft operatively connected with said pinion and a disconnectible clutch, comprising a fixed and a translatable member, between said two shafts; manual means for rotating said second shaft, said manual means comprising a hand-wheel journaled in said drill-head; a clutch member carried by said hand-wheel and a translatable clutch-member splined to said second shaft; a sub-casing carried by said drill-head; a clutch actuating bar slidably mounted in said sub-casing and operatively connected with the translatable members of said two clutches; a clutch-actuating lever operatively connected with said slide-bar and adapted to shift the bar in one direction to disconnect the manual traverse mechanism and connect the power feed; and a spring acting upon said slide-bar and adapted upon release of the actuating lever to shift the bar in the direction opposite to that in which it was moved by the lever, to automatically and instantaneously disconnect said power drive and immediately thereafter to connect the manual drive.

12. The combination as set forth in claim 11, characterized by this, that a safety device is provided between the slide-bar and the shiftable clutch-member of the manual drive, to permit the slide-bar to completely disconnect the power drive without connecting the manual drive should the teeth of the manual drive clutch-members then be not in registry.

13. The combination as set forth in claim 11, characterized by this, that a spring is interposed between the second shaft and the translatable clutch-member carried thereby and normally presses the clutch-member downwardly against a fork carried by the slide-bar; that the clutch-member is provided with an annular groove of greater width than the thickness of the fork which is held therein, thus providing lost motion which permits the slide-bar to move downward independently of the clutch-member, should the teeth of the two manual drive clutch-members interfere, said spring acting to engage said clutch-members when they are relatively rotated.

14. A radial drill combining an upright column; a radial arm; a drill-head translatably mounted on the arm; a rack-bar carried by said arm; a pinion journaled in said drill-head and meshing with said rack-bar; power means for rotating said pinion to cause it to translate said drill-head on said arm, said means comprising a motor; an operative connection between said motor and said pinion; a motor controller; manual means for actuating said motor controller including a rock-shaft; a rock-arm carried thereby for actuating said motor controller; a hand-lever secured to said rock-shaft and providing means for turning said rock-shaft in one direction to start the motor, said hand-lever also controlling the operative connection between the motor and the pinion; and automatic means active immediately upon release of the hand-lever to turn the rock-shaft in a reverse direction and stop the motor.

15. A radial drill combining an upright column; a radial arm; a drill-head translatably mounted on the arm; a rack-bar carried by said arm; a pinion journaled in said drill-head and meshing with said rack-bar; power means for rotating said pinion to cause it to translate said drill-head on said arm, said means comprising a motor; an operative connection between said motor and said pinion; a motor controller; manual means for actuating said motor controller including a rock-shaft; a rock-arm carried thereby for actuating said motor controller; a hand-lever secured to said rock-shaft and providing means for turning said rock-shaft in one direction to start the motor, said hand-lever also controlling the operative connection between the motor and the pinion; and automatic means active immediately upon release of the hand-lever to turn the rock-shaft in a reverse direction and stop the motor, said means comprising a cam carried by said rock-shaft; a spring-pressed device adapted to be displaced by said cam when said shaft is turned to start said motor, and becoming active when the said hand-lever is released to shift said cam and thereby return said shaft to its neutral position.

16. A radial drill combining an upright column; a radial arm; a drill-head translatably mounted thereon; a rack-bar carried by said arm; a pinion rotatably journaled in said drill-head and meshing with said rack-bar; power means for rotating said pinion in reverse directions, to cause it to translate said drill in opposite directions on said arm; said means comprising a reversible motor; an operative connection between said motor and said pinion; a motor controller having a neutral position and two active positions; means for actuating said motor controller in opposite directions to cause said motor to be rotated in either direction, said means including a rock-shaft; a rock-arm carried thereby and operatively connected with said motor controller; a hand-lever operatively connected with said rock-arm and affording means for turning said rock-shaft in opposite directions from a neutral position, said hand-lever also controlling the operative connection between the motor and the pinion; and means active upon release of the hand-lever for automatically returning said rock-shaft and motor controller to their neutral positions, said means including an arm carried by said rock-shaft and providing two opposed cam-surfaces, a roller cooperating with said cam-surfaces and adapted to be displaced from its normal position by one of said cam-surfaces when said rock-shaft is rotated in either direction, and a spring acting upon said roller to return it to its normal position and thereby return said rock-shaft and motor controller to their neutral positions.

17. A radial drill combining an upright column; a radial arm; a drill-head slidably mounted thereon; a rack carried by said arm; a pinion journaled in said drill-head and meshing with said rack; power actuated means for rotating said pinion to cause it to translate said drill-head on said arm; said means comprising a motor; an operative connection between said motor and said pinion including a disconnectible clutch comprising shiftable and non-shiftable members; a slide-bar for controlling said clutch; a motor controller; a rock shaft; an arm carried by said rock-shaft for actuating said motor controller; a hand-lever pivoted to said rock-shaft and connected with said slide-bar and movable in one plane to shift said slide-bar in one direction to cause it to effect a driving connection between said motor and said pinion, and movable in another plane to rotate said rock-shaft to start the motor; and means active when said hand-lever is released to shift said slide-bar in the opposite direction to disconnect the clutch and simultaneously therewith to rotate said rock-shaft to stop the motor.

18. In a radial drill, the combination comprising an upright column; a radial arm; a drill head movable along the arm; a motor carried by the head for effecting movement of the head in either direction along the arm; hand operated means for effecting movement of the head along the arm; and means comprising a lever on the head for preventing simultaneous operative connection of the power operated means and the hand operated means to operate the head and for controlling the operation of the motor.

19. In a radial drill, the combination comprising an upright column; a radial arm; a drill head mounted to have movement along the arm; means comprising a motor mounted on the head for moving the head along the arm; hand operated means for effecting movement of the head along the arm; and means carried by the head for not only selectively connecting the motor and the hand operating means to operate the head along the arm but also for starting and stopping the motor in accordance with such selection.

20. In a radial drill, the combination comprising an upright column; a radial arm; a drill head mounted to have movement along the arm; means comprising a motor mounted on the drill head for effecting rapid traverse movements of the head along the arm; means comprising a single lever movable from a neutral position to a plurality of operative positions for connecting said means for operating the head along the arm, for operating the motor in a forward and in a reverse direction and for starting the motor; and means for automatically returning said lever to its neutral position when it is released.

21. A radial drill combining an upright column; a radial arm; a drill-head translatably mounted on said arm; a first member extending lengthwise of said arm; a second member carried by said drill-head and operatively connected with said first member; manual means to rotate one of said members to translate said drill-head on said arm at a slow rate; power means to rotate one of said members to cause traverse of said drill-head on said arm at a rapid rate, said power means comprising a prime mover and an operative driving connection between said prime mover and one of said members; and an impositive driving element embodied in said driving connection to render said power means temporarily ineffective when subjected to undue strain.

22. A radial drill combining an upright column; a radial arm; a drill head translatably mounted on said arm; a first member extending lengthwise of said arm; a second member carried by said drill-head and operatively connected with said first member; manual means carried by said drill-head to rotate one of said members to cause translation of said drill-head, said manual means including a clutch; power means to rotate one of said members to cause translation of said drill-head, said power means including a clutch; means for selectively engaging said clutches normally to render said member-rotating means successively and instantaneously effective, said last named means including a lost-motion device adapted to permit a complete disengagement of one of said clutches and the delayed subsequent engagement of the other of said clutches should the parts of one of said clutches be in non-mating position.

23. In a drilling machine, the combination of the drill-arm, the drill-head, means operatively disposed between said drill-head and said drill-arm for imparting reverse traversing movements to said drill-head on said drill-arm, manual operating means and power operating means including reversing mechanism mounted on and movable with said drill-head and having operative connections with said means operatively disposed between said drill-head and said drill-arm and including a movable member for selective employment of said respective operating means, and a manual control part mounted on and movable with said drill-head having operating connections with said reversing mechanism and said movable member by movements in reverse directions of said manual control part, said connections being arranged whereby moving said manual control part to its intermediate position locates the reversing mechanism and said movable member in neutral relation to permit traversing movements by said manual operating means.

24. In a drilling machine, the combination with the drill-arm and the drill-head, of means operatively disposed between the drill-head and the drill-arm for imparting traversing movements in reverse directions to the drill-head on the drill-arm, said means comprising a rotative element, mounted on and movable with the drill-head, manual operating means and power operating means for said rotative element, said power operating means including a reversely rotative driving element, a power interrupting means, and a manual control member mounted on and movable with the drill-head controlling said power interrupting means and controlling the direction of rotation of said reversely rotative driving element.

25. In a drilling machine, the combination with the drill-arm and the drill-head, of means operatively disposed between the drill-head and the drill-arm for imparting traversing movements to the drill-head on the drill-arm, a reversible electric motor having operative connection with said means, said operative connection comprising a clutch, motor circuits for reverse rotations of said motor, switches therein, and a manual control member for selectively combinedly operating said switches and said clutch.

26. In a radial drilling machine, the combination with the radial drill-arm and the drill-head, of means operatively disposed between the drill-head and the drill-arm for imparting traversing movements to the drill-head on the drill-arm, a reversible electric motor mounted on the drill-head, said motor having operative connection with said means to traverse said drill-head in opposite directions, said operative connection including a clutch, motor circuits for reverse rotations of said motor, switches therein, and a manual control member on said drill-head arranged to selectively operate said switches, said control member having operative connection with said clutch to operate said clutch for combined rotation of said motor and engagement of said clutch.

In witness whereof, I hereunto subscribe my name.

DAVID C. KLAUSMEYER.